United States Patent [19]

Flaxl

[11] Patent Number: 5,729,236
[45] Date of Patent: Mar. 17, 1998

[54] IDENTIFICATION SYSTEM READER WITH MULTIPLEXED ANTENNAS

[75] Inventor: Thomas Flaxl, Train, Germany

[73] Assignee: Texas Instruments Incorporated, Dallas, Tex.

[21] Appl. No.: 431,249

[22] Filed: Apr. 28, 1995

[51] Int. Cl.[6] .............................................. H01Q 3/02
[52] U.S. Cl. .................... 342/374; 342/45; 455/277.1; 333/258; 333/262
[58] Field of Search .............. 342/374, 45; 455/277.1, 455/277.2; 333/262, 258, 101, 106

[56] References Cited

U.S. PATENT DOCUMENTS

| | | | |
|---|---|---|---|
| 4,143,369 | 3/1979 | Ayers | 343/6.5 R |
| 4,378,580 | 3/1983 | Stich | 361/91 |
| 4,924,235 | 5/1990 | Fujisaka et al. | 342/374 |
| 5,041,835 | 8/1991 | Matsumoto | 342/374 |
| 5,053,774 | 10/1991 | Schuermann et al. | 342/44 |
| 5,300,900 | 4/1994 | Bellantoni | 333/17.2 |
| 5,355,139 | 10/1994 | Hirata et al. | 342/371 |
| 5,465,411 | 11/1995 | Koike | 455/275 |

Primary Examiner—Gilberto Barrón, Jr.
Assistant Examiner—Dao L. Phan
Attorney, Agent, or Firm—Robby T. Holland; James C. Kesterson; Richard L. Donaldson

[57] ABSTRACT

An electronic system 8 is disclosed herein. The system includes circuitry 10 for processing a signal and a plurality of antennas 12a–12b. A plurality of switches 22a–22b are also included. Each of the switches 22a–22b is coupled between the processing circuitry 10 and a corresponding one of the antennas 12a–12b. Each of the switches 22a–22b includes first and second power MOSFETs where the source of the first MOSFET is coupled to the source of the second MOSFET. The system further includes circuitry 28 for selecting of one of the plurality of switches 22a–22b to be on.

19 Claims, 5 Drawing Sheets

IDENTIFICATION SYSTEM READER WITH MULTIPLEXED ANTENNAS

CROSS-REFERENCE TO RELATED APPLICATIONS

The following co-assigned patent and patent application are hereby incorporated herein by reference:

| Pat. No. | Filing Date | Issue Date | TI Case No. |
| --- | --- | --- | --- |
| 5,053,774 | 02/13/91 | 10/01/91 | TI-12797 A |
| 5,450,088 | 11/25/92 | 9/12/95 | TI-16688 |

FIELD OF THE INVENTION

This invention generally relates to identification systems and more specifically to an identification system reader with multiplexed antennas.

BACKGROUND OF THE INVENTION

There is a great need for devices or apparatuses which make it possible to identify or detect objects in a contactless manner and over a certain distance. An additional desire exists to be able to change the data stored in, or operating characteristics of, such devices or apparatuses (i.e. "program" the devices or apparatuses).

It is, for example, desirable to request contactless and over a certain distance identifications which are uniquely assigned to an object and which are stored in the device or apparatus so that, for example, the object may be identified. A determination may also be made as to whether or not a particular object exists within a given reading range. This concept can be used in a number of applications including security identification (e.g., security badges), inventory control, waste management, vehicle identification, and many others.

One such identification system is disclosed in U.S. Pat. No. 5,053,774 ('774) issued on Oct. 1, 1991 to Schuermann et al. In that arrangement, the transponder (or responder) unit includes an energy accumulator which stores the energy contained in an RF interrogation pulse, which is transmitted from a reader (or interrogator). The transponder includes circuitry which senses the termination of the reception of the RF interrogation pulse and the presence of a predetermined energy mount in the energy accumulator. The circuitry triggers the excitation of an RF carrier wave generator operating with the frequency contained in the RF interrogation pulse. A signal generated by the RF carrier wave generator can then be retransmitted back to the reader thereby conveying information stored within the transponder.

In some applications the reading repetition rate of a transponder will be slow and it is desirable couple a number of reading antennas to a single RF reader module. Therefore, there is presently a need for an identification reader with multiplexed antennas.

SUMMARY OF THE INVENTION

Other objects and advantages will be obvious, and will in part appear hereinafter and will be accomplished by the present invention which provides an identification reader with multiplexed antennas.

An electronic system is disclosed herein. The system includes circuitry for processing a signal and a plurality of antennas. A plurality of switches are also included. Each of the switches is coupled between the processing circuitry and a corresponding one of the antennas. Each of the switches includes first and second power MOSFETs where the source of the first MOSFET is coupled to the source of the second MOSFET. The system further includes circuitry for selecting of one of the plurality of switches to be on.

In one embodiment, a novel switch/driver circuit can be used to selectively couple a first node to a second node, e.g., to couple an antenna to a processing circuit. In this embodiment, a first power MOSFET with its drain coupled to the first node and a second power MOSFET transistor with its drain coupled to the second node comprise the switch. The source of the second MOSFET is coupled to the source of the first MOSFET, i.e., the MOSFETs are coupled antiserially. A bipolar transistor has a base coupled to the gates of the first and second MOSFETs. A first diode is coupled to a high voltage node and a zener diode is coupled between the first diode and the emitter of the bipolar transistor. The circuit also includes a resistor coupled between the collector of the bipolar transistor and the first diode. In this circuit, a select signal is provided to the switch/driver circuit such that the switch/driver circuit is galvanically isolated from the select circuit.

In yet another embodiment, the present invention can be utilized to constitute a reader for an identification system comprising. This system will typically include interrogator processing circuitry which has first and second antenna nodes. A number of antennas are coupled to one of the antenna nodes. A switch is associated with each one of the antennas between the antenna and the interrogator processing circuitry. Each switch is given by a driver circuit. Each driver circuit includes a supply node which is coupled to the second antenna node of the interrogator processing circuitry. Channel selection circuitry is provided to generate a select signal for each one of the driver circuits. The channel selection circuit is galvanically isolated from each of the driver circuits.

The antenna multiplexer of the present invention has a number of advantages. First, the antenna multiplexed used with the present invention can be the stone as the standard antenna used with prior art systems. In effect, the antenna system can support receive as well as transmit functions to be multiplexed between the different antennas. This feature provides a significant advantage by multiplexing the transmit and receive functions as opposed to a receive-only antenna multiplexers.

Also, since standard antennas can be used, there is no change in the basic reading characteristic when multiplexing several antennas to a single interrogator. This is not the case when multiplexing special receive-only antennas to an interrogator.

The transmit antenna multiplexer can also be implemented very easily since it is not necessary to change anything inside the interrogator. The transmit antenna multiplexer can just be plugged between the antennas and the interrogation circuit.

In addition, the number of multiplexed antennas can be expanded very easily and the number of channels are unlimited. For one additional channel only the driver/switch unit and one tuning matrix block (i.e., set of jumpers) have to be added. (The channel selection circuit must be expanded only if all selection lines are already used up.) The timing capacitors drive unit is unaffected by the number of multiplexed antennas.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF ILLUSTRATIVE EMBODIMENTS

The making and use of various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 7A:
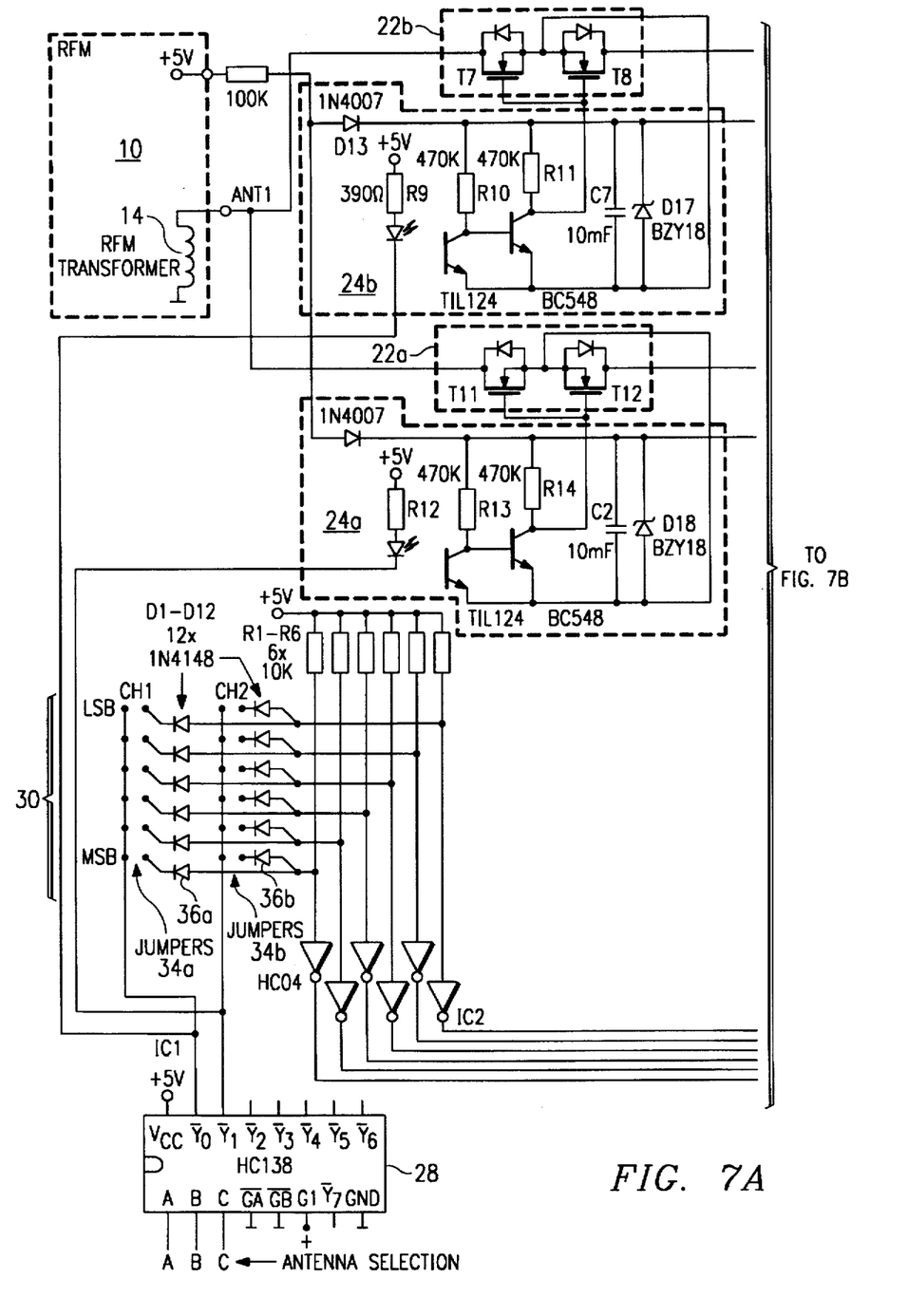
FIGS. 7A and 7B are a schematic diagram of a specific embodiment reader circuit.
Figure 7B:
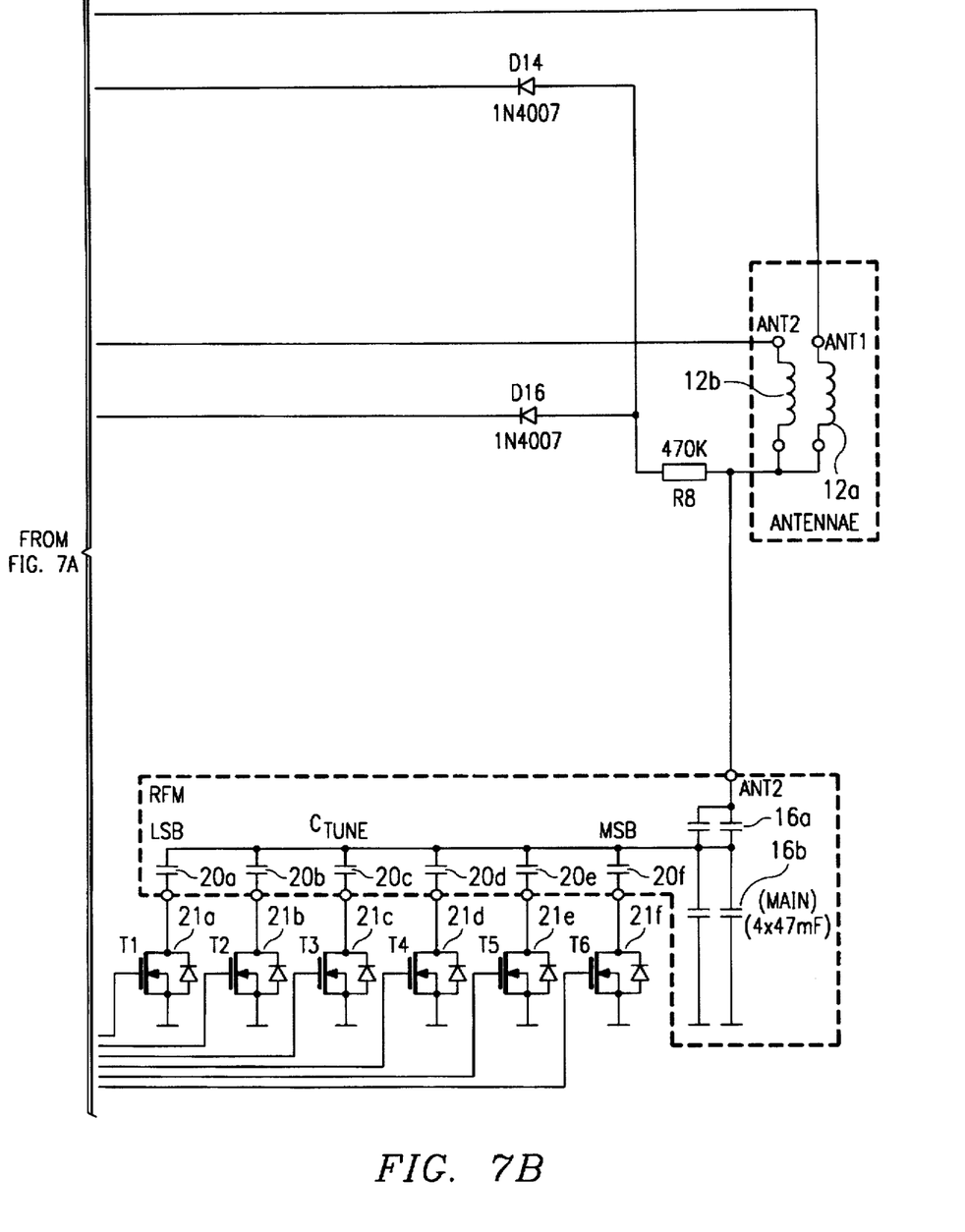

The following description of the present invention begins with a short description of a prior art reader. An improved reader which includes a number of antennas multiplexed to a single reader circuit will then be described with respect to FIG. 2. A detailed view of a preferred embodiment tuning circuit and switch/driver circuit will then be described. Finally, a specific embodiment circuit is illustrated in FIGS. 7A and 7B.

Figure 1:
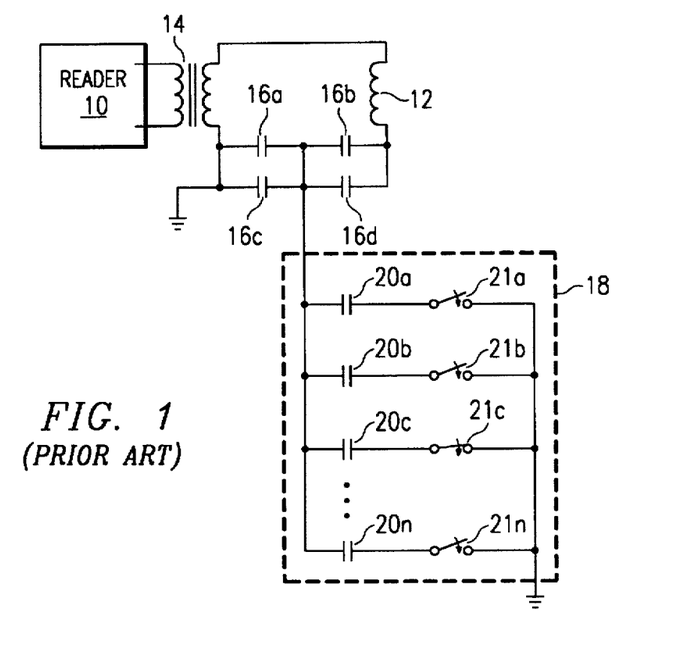
FIG. 1 is a block diagram of a known reader and antenna.

FIG. 1 illustrates a known system for coupling an identification reader 10 to an antenna 12. In the preferred embodiment, the reader circuit 10 may comprise a reader such as the one used in a TIRIS™ system manufactured by the assignee of this invention. An example of circuitry which may be used in reader circuit 10 is described in U.S. Pat. No. 5,053,774 issued Oct. 1, 1991. For the sake of brevity, this description will not be repeated herein but instead is incorporated by reference.

An antenna transformer 14 couples the reader 10 to the antenna 12. The transformer 14 can couple energy from a transmitter within reader 10 to antenna 12 and also from antenna 12 to a receiver within the reader 10. In other embodiments, the antenna 12 could be used to only transmit or only receive.

Capacitors 16a–16d are provided to tune the circuit so that only the desired frequency energy will be transmitted and/or received. Accordingly, the capacitors 16a–16d and antenna coil 12 serve as a resonant circuit. Four capacitors 16a–16d have been included because often one capacitor will be unable to withstand the high voltage and current at the antenna resonator. The parallel and serial connection technique illustrated reduces the current and voltage load on the capacitors 16a–16d. It should be understood, however, that any number of capacitors (i.e., one or more) can be used to serve this function.

Also illustrated in FIG. 1 is tuning capacitor 18. The tuning capacitor 18 preferably comprises a variable capacitor which can be adjusted to compensate for variations in the impedance of the resonant circuit. In the preferred embodiment, the tuning capacitor 18 comprises a plurality of binary weighted capacitors 20a–20n coupled in parallel. Each of the capacitors 20a–20n has an associated switch 21a–21n which can be used to selectively include the capacitor 20 in the circuit. As is well known, six binary weighted capacitors will provide 64 (i.e., $2^6$) possible capacitance values.

Figure 2:
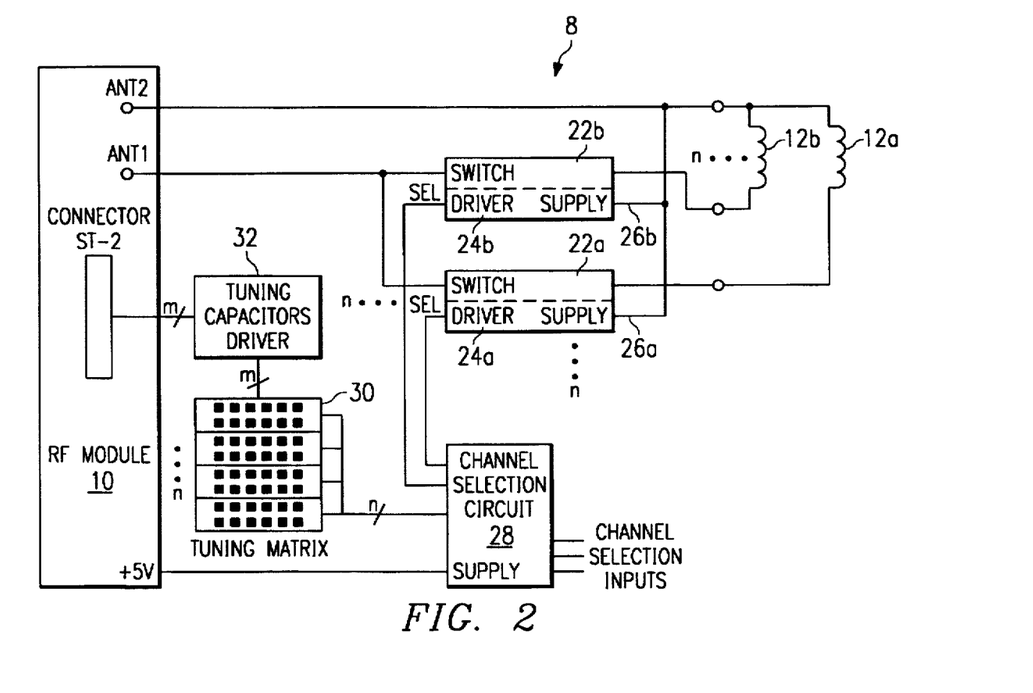
FIG. 2 is a block diagram of a reader with multiplexed antennas.

In some applications, it is desirable to include a number of antennas 12a–12n with a single reader 10 as shown in FIG. 2. For example, if the reading repetition rate of a transponder (not shown, see the '774 patent for a description of transponders which may be used with the present invention) is slow, a number of antennas 12a–12n can be connected to a single reader 10. The present invention discloses a multiplexer circuit which can accomplish this goal.

System costs can be reduced by using a single reader circuit 10 with several antennas 12. There is no inherent limitation on the number of antennas connected to the multiplexer circuit. The multiplexer circuit herein is especially usable with a RF module with a transmitter power stage and antenna circuit as described in the '774 patent. But nevertheless, the concept of the multiplexer circuit can certainly be used with different RF modules which include other transmitter power stages and antenna circuits.

FIG. 2 illustrates a preferred embodiment identification reader 8 which includes multiplexed antennas 12a and 12b. The circuit of FIG. 2 includes only two antennas for the sake of simplicity, but it should be understood that any number of antennas can be used.

The embodiment of FIG. 2 includes interrogator processing circuitry 10. As mentioned above, the circuitry 10 may include the reader circuitry disclosed in the '774 patent or the circuitry disclosed in co-pending application Ser. No. 07/981,635, now U.S. Pat. No. 5,450,088. The circuitry 10 further includes first and second antenna nodes, labeled ANT1 and ANT2 in FIG. 2. While interrogator processing circuitry 10 is labeled "RF Module" in this figure, other frequency circuits may also be utilized. Nothing in the present invention limits the circuit to RF frequencies.

In this embodiment, both the first and second antennas 12a and 12b are coupled directly to the second antenna node ANT2. The other terminals of the antennas 12a and 12b are coupled to the first antenna node ANT1 through switches 22a and 22b, respectively. Accordingly, the circuit 8 will include one switch 22, each associated with a corresponding antenna 12.

Comparing FIG. 2 with FIG. 1, it is noted that the transformer 14 and resonant capacitors 16a–16d are implemented within interrogator processing circuitry. However, this feature is not critical to the present invention. In other words, the transformer 14 and/or the capacitors 16a–16d can be implemented on-chip within the interrogator processing circuitry as illustrated in FIG. 2 or can be implemented externally as illustrated in FIG. 1.

Driver circuits 24a and 24b are also included in the reader circuit 8. Each driver circuit 24 is coupled so as to drive a corresponding one of the switches 22. In the preferred embodiment, each driver circuit 24 includes a supply node 26 which is coupled to the second antenna node ANT2. The preferred embodiment driver/switch circuit 24/22 will be described in greater detail below in reference to FIG. 5.

During operation, only one of the antennas 12a–12b will be coupled to interrogator processing circuitry 10. Channel selection circuitry 28 is included to provide a select signal SEL to each of the switch/driver circuits 22/24. The channel selection circuit 28 determines which antenna 12 is active, that is, connected to the interrogator circuitry 10. The select signal may generally comprise a digital signal which is utilized to turn the corresponding switch either "on" (i.e., conducting) or "off" (i.e., non-conducting).

While illustrated external to the interrogator circuitry 10, it should be understood that the channel selection circuitry 28 may be internal as well. In the preferred embodiment the channel selection circuit 28 comprises a decoder but other circuitry can be used. Any circuit which received an input and generates one (or none) corresponding high (or low) voltage and the remaining low (or high) will suffice.

As discussed above with respect to prior art FIG. 1, the resonant antenna circuit may need a tuning capacitor to ensure the proper frequency signals will be transmitted and received. With multiple antennas 12a–12b, the problem becomes worse. Because of the differences in manufacturing, each of the antennas will be a little different and therefore require a different tuning capacitor value.

Figure 3:
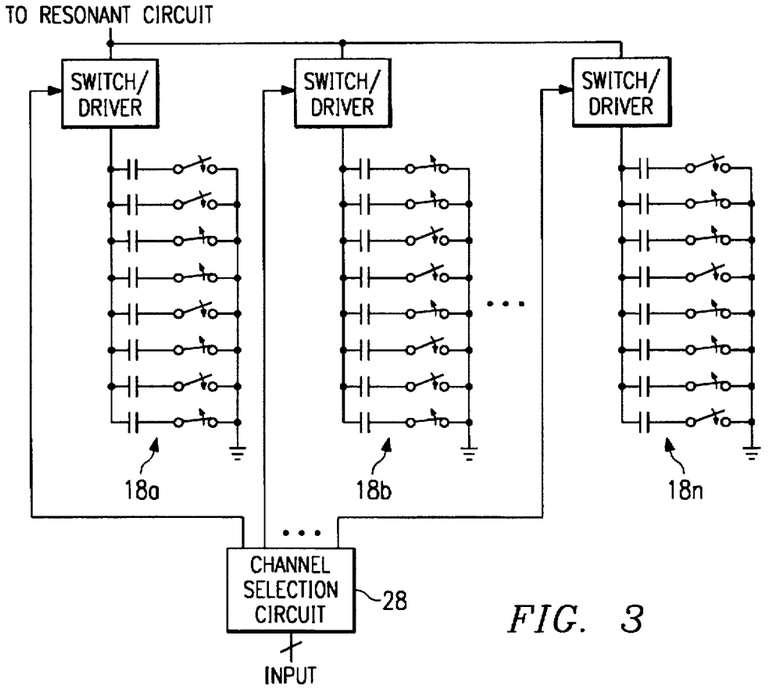
FIG. 3 is a block diagram of a first embodiment impedance tuning circuit.

FIG. 3 illustrates one tuning circuit for individually tuning each antenna 12. In this embodiment, a tuning capacitor 18a–18n is provided for each antenna 12. The channel selection circuit 28 then selects which one of the capacitors 18 will be coupled to the resonant circuit. While this technique provides individualized tuning for each antenna 12, it is cumbersome because of the large number of capacitors required.

The tuning matrix 30 of FIG. 2 provides a better technique for providing the desired tuning function. The channel selection circuit 28 controls the tuning matrix 30 and the tuning capacitors/driver 32. In the preferred embodiment, the tuning matrix 30 contains an individual jumper arrangement for each antenna 12. The individual jumper arrangement is addressed by the channel selection circuit 28 and the tuning capacitors/driver 32 operates the corresponding tuning capacitors inside the interrogation circuit 10.

Figure 4:
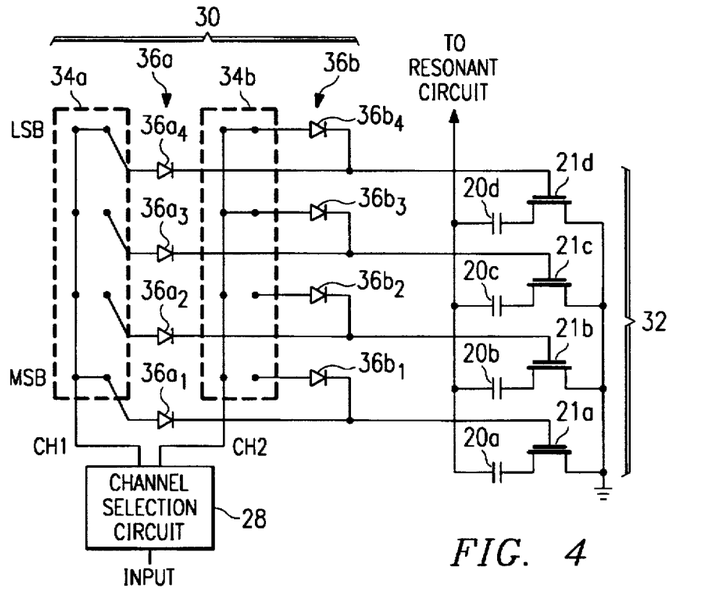
FIG. 4 is a block diagram of a second embodiment impedance tuning circuit.

The preferred tuning circuitry is illustrated in more detail in FIG. 4. A set of jumpers 34a and 34b is provided for each antenna 12a–12b. These jumpers will be proprogrammed with the appropriate connections so that the proper tuning capacitance value can be obtained. By way of example, the first set of jumpers 34a is programmed so that the most significant bit (MSB) capacitor 20a and the least significant bit (LSB) capacitor 20d will be selected when the first antenna 12a is selected. As another example, the second set of jumpers 34b is programmed so that the two least significant bit capacitors 20c and 20d will be selected when the second antenna 12b is selected.

To understand the operation of the tuning circuit, assume the channel select circuit 28 selects channel 1. In that case, the line ch1 is high and the line ch2 is low. Because the MSB, and LSB jumpers are connected, the high voltage on line ch1 will be coupled to switch transistors 21a and 21d through diodes 36a₁ and 36a₄, respectively. As a result, the switch transistors 21a and 21d will be conductive and the corresponding capacitors 20a and 20d will be coupled to the resonant circuit.

During this operation, the capacitors 20b and 20c will not be coupled since the corresponding switch transistors 21b and 21c will be non-conductive. In addition, the second set of jumpers 34b will be isolated by reverse biased, and therefore non-conducting, diodes 36b.

Figure 5:
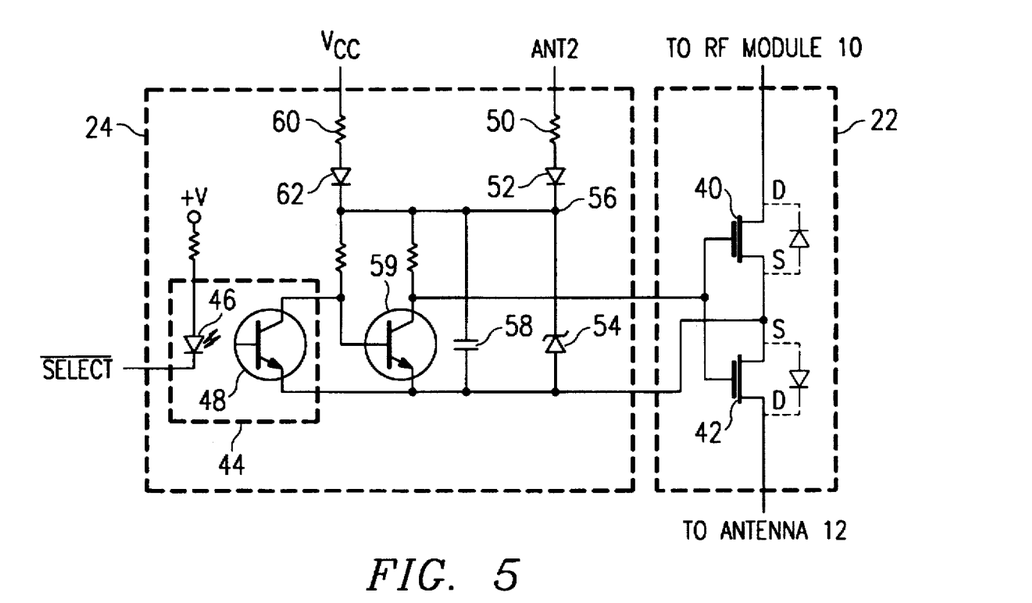
FIG. 5 is a schematic diagram of a preferred embodiment switch and driver circuit.

It is noted that the tuning capacitors 20a–20d do not require the more complex switch/driver circuit 24/22 (FIG. 5) which is preferred for the antennas. This is because there will be a different voltage across the capacitors 20a–20d. In the embodiment of FIG. 4, the timing capacitors 20a–20d are connected to the antenna resonator via MOSFETs 21a–21d. However, the tuning capacitor at a switched off MOSFET (e.g., capacitor 20b and 20c if the first channel is selected) is charged up with a DC voltage via the parasitic drain/source diode of this MOSFET (21b or 21c in the example). Thus a 'positive' DC voltage is charged onto this tuning capacitor. This leads to the fact that the voltage at the drain of the MOSFET no longer becomes negative and thus the parasitic diode is no longer conducting. So in this special case, the switch and driver circuit of FIG. 5 are not necessary.

The preferred embodiment driver circuit 24 and switch circuit 22 will now be described in more detail with reference to FIG. 5. The switch 22 comprises low-resistive and high-voltage power MOSFETs 40 and 42. The power MOSFETs are coupled so that the source S of the first MOSFET 40 is coupled to the source S of the second MOSFET 42. This antiserial connection is made to cancel out the parasitic diode (70 in FIG. 6) which exists between the source S and drain D of the MOSFETs.

Figure 6:
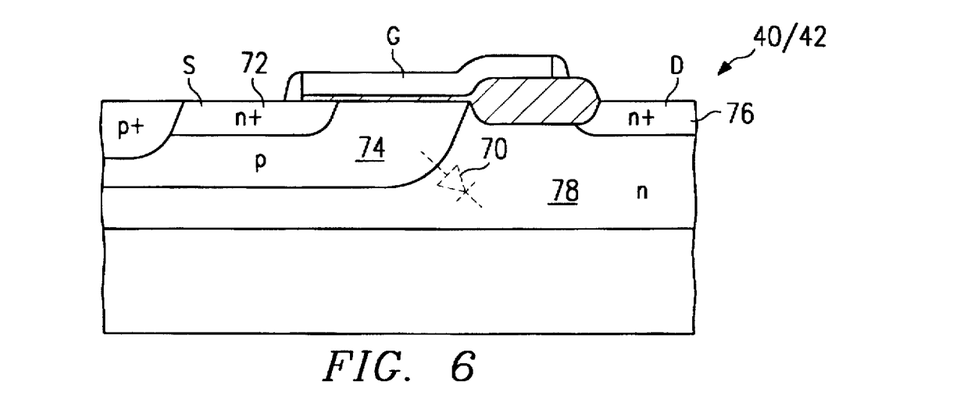
FIG. 6 is a cross sectional view of a power MOSFET which can be used within the switch circuit of FIG. 5.

FIG. 6, which has been included to help illustrate the existence of the parasitic diode, illustrates a cross-sectional view of an exemplary power MOSFET to illustrate the parasitic diode 70. When the diode 70 is conducting, current flows from the source pin S to the drain pin D through the following regions: n+ source region 72, p channel region 74, n substrate 78 and n+ drain region 76. Therefore, the parasitic diode is formed by the p channel region 74 and n substrate 78. When the FET is switched on, the p channel region 74 is transformed into an inverted region and thus the FET is conducting.

Because this parasitic diode 70 cannot easily be avoided, one way to eliminate the conducting path (via the parasitic diode 70) is to include an additional device in series, e.g. another diode. In order to have a low resistive path when the MOSFET 40 is switched on, the second serial device is preferably another MOSFET 42. This device gives low on resistance. When connecting two MOSFETS 40 and 42 antiserially, there is no longer a conducting path through both antiserial MOSFETs (when switched off) because the parasitic diode in one of the two MOSFETs 40 or 42 will always be biased off. In other words, for each polarity applied to both MOSFETs 40 and 42, there is always one of the parasitic diodes blocking any parasitic current. Thus, no parasitic current will flow from RF module 10 to antenna 12 (in FIG. 5).

The power MOSFETs for the driver/switch unit 24/22 can be selected according to the application. For high quality factor antennas, high quality MOSFETs should be used. For example, the resistance between source and drain when the transistor is conducting ($R_{Ds,on}$) can be 0.05 Ohms or less. But for applications with antennas which have a low quality factor, MOSFETs with a higher $R_{DS,on}$ and low drain-source voltage can also be used.

The switch 22 is operated by driver circuit 24. Because the MOSFETs 40 and 42 are connected antiserially, the source potential (at nodes S) is floating. Therefore, the driver circuit 24 must also be floating. As a result, the driver circuit 24 receives the select signal SELECT (from selection circuit 28, FIG. 2) via an optocoupler 44. The optocoupler 44 comprises a light emitting diode 46 which rams on a transistor 48 when the SELECT signal is low. While illustrated with an optocoupler 44, any other input circuit which galvanically isolates the driver 24 from the select circuit 28 can be used.

The transistor 59 is included so that the optocoupler 44 is active (i.e., conducting light emitting diode 46 and transistor 48) only when the corresponding channel is active (i.e., corresponding switch 22 is conducting). This element therefore reduces the current consumption of the whole circuit since there is only current flow through the optocoupler 44 of an active channel. As only one channel at a time is active in most applications, this reduction results in minimum current consumption of the driver circuit 24.

The driver circuit 24 is supplied from high RF voltage (e.g., several hundred volts peak-to-peak) of the antenna resonator ANT2 (see also FIG. 2). The resistor 50 is provided to limit the current from the antenna resonator and thus avoids damping of the antenna resonator. Zener diode 54 is provided to limit the voltage at node 56. This voltage is limited so that it will not exceed the maximum allowed gate-source voltage of the MOSFETs 40 and 42 and the collector-emitter voltage of the drive transistor 59. The diode 52 rectifies the A/C signal from antenna resonator node ANT2. Rectification is desired to store a DC voltage on capacitor 58. The voltage stored on capacitor 58 is used as gate drive voltage when the MOSFETs 40/42 are switched on.

Because there is no AC voltage coming from the antenna resonator node ANT2 when the transmitter is switched off, the MOSFETs 40 and 42 could not be turned on from an idle start point (i.e., when none of the antennas are connected and the antenna resonator node ANT2 has no voltage applied). Since the node ANT2 cannot be taken to a high voltage until at least one of the switches 22 is on, another technique is needed to store a DC voltage on capacitor 58.

Storing this DC voltage on capacitor 58 in an idle state can be done via resistor 60 and diode 62. The charge capacitor 58 is charged up from an external positive supply Vcc via the following elements: resistor 60, diode 62, the parasitic diode of MOSFET 42 and the antenna terminal ANT1 (via the transformer to ground). Therefore the parasitic diode of the MOSFET 42 is actively used in the idle state to have a DC path to ground to store a DC voltage on charge capacitor 58. The charge on capacitor 58 enables to switch on MOSFETs 40 and 42. The diode 62, as well as diode 52, are included to decouple the high RF voltage node ANT2 from the supply and node Vcc.

It is noted that to start the system from an idle state only one of the switches 22 needs to be enabled to conduct. In other words, the connection to supply node Vcc, resistor 60 and diode 62 may be eliminated from all but one of the drive circuits 24a-24n in the system. For example, if only the channel 1 drive circuit 24a includes the connection to the DC power supply, then the circuit would always be started by selecting channel 1. After the antenna resonator node ANT2 charges up, any of the other channels may be selected.

A more specific schematic diagram of an embodiment of the present invention is illustrated in the circuit of FIGS. 7A and 7B. The circuit of FIGS. 7A and 7B provides further details as to the specific configuration and some of the component values which can be used to implement the present invention. The circuit has been labeled with reference numerals which correspond to those used in the previously discussed figures. In this embodiment, inverters HC04 have been included and as a result the polarity of the diodes 36 has been reversed. It is of course understood that other specific designs could be utilized to implement the broad concepts described herein.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic system comprising:
   circuitry for processing a signal;
   a plurality of antennas;
   a plurality of switches wherein each of said switches is coupled between said circuitry for processing and a corresponding one of said antennas, each of said switches including first and second power MOSFETs each having a source and a drain, wherein the source of the first MOSFET is coupled to the source of the second MOSFET; and
   circuitry for selecting at most one of said plurality of switches to be on.

2. The system of claim 1 wherein said power MOSFET transistors comprise n-channel power MOSFET transistors.

3. The system of claim 1 and further comprising a plurality of driver circuits, each driver circuit associated with one of said switches for driving said switch, each said driver circuits coupled to said circuitry for selecting.

4. The system of claim 3 wherein each driver circuit includes an optocoupler for receiving a select signal from said circuitry for selecting.

5. The system of claim 3 wherein each of said driver circuit comprises:
   a resistor coupled to a high voltage node of an antenna resonator;
   a rectifying circuit coupled to said resistor;
   a transistor for receiving a select signal from said circuit for selecting, said transistor coupled to a gate of each of said first and second power MOSFET transistors; and
   a zener diode coupled between said rectifying circuit and said transistor.

6. The system of claim 1 wherein said circuitry for processing a signal comprises a reader of an identification system.

7. The system of claim 1 and further comprising a plurality of tuning capacitors, said tuning capacitors selectively associated with each of said antennas.

8. The system of claim 7 wherein said tuning capacitors comprise binary weighted capacitors.

9. A switch/driver circuit for selectively coupling a first node to a second node, said circuit comprising:
   a first power MOSFET with a source, a drain and a gate, said drain coupled to said first node;
   a second power MOSFET transistor with a source, a drain and a gate, said drain coupled to said second node and said source coupled to source of said first MOSFET;
   a bipolar transistor with an emitter, a collector and a base, said base coupled to the gates of said first and second MOSFETs;
   a first diode coupled to a high voltage node;
   a zener diode coupled between said first diode and the emitter of said bipolar transistor;
   a first resistor coupled between said collector and said first diode; and
   circuitry for coupling a select signal from a select circuit to said switch/driver circuit such that said switch/driver circuit is galvanically isolated from said select circuit.

10. The circuit of claim 9 wherein said circuitry for coupling comprises an optocoupler.

11. The circuit of claim 9 and further comprising a capacitor coupled in parallel with said zener diode.

12. The circuit of claim 9 and further comprising:
a second resistor coupled to a supply voltage node;
a second diode coupled between said second resistor and said capacitor; and
a third resistor coupled between said second diode and the base of said bipolar transistor.

13. A reader for an identification system comprising:
interrogator processing circuitry;
a transformer coupled to said interrogator processor circuitry, said transformer including first and second antenna nodes;
at least one resonant capacitor with a first terminal coupled to said first antenna node;
a plurality of antennas each including first and second terminals, wherein the first terminal of each antenna is coupled to said second antenna node of said transformer;
a plurality of switches wherein each switch is associated with a corresponding one of said antennas, each switch having a first node and a second node wherein said first node is coupled to a second terminal of said resonant capacitor and wherein said second node is coupled to the second terminal of said corresponding antenna;
a plurality of driver circuits wherein each driver circuit is coupled as to drive a corresponding one of said switches, each driver circuit including a supply node which is coupled to said second antenna node of said transformer;
channel selection circuitry for providing a plurality of select signals wherein each of said select signals is coupled to a corresponding one of said driver circuits, said channel selection circuit being galvanically isolated from each of said driver circuits, said select signals provided to couple at most one of said plurality of antennas to said interrogator processing circuitry.

14. The reader of claim 13 and further comprising:
a plurality of tuning capacitors;
a tuning matrix, said tuning matrix including a plurality of sets of jumpers wherein each of said sets of jumpers corresponds to one of said antennas, said tuning matrix for receiving a tuning select signal from said channel selection circuit so that selective ones of said plurality of tuning capacitors are coupled to said resonant capacitor.

15. The reader of claim 14 wherein said at least one resonant capacitor comprises two resonant capacitors coupled in series, wherein said tuning capacitors are coupled between said two resonant capacitors.

16. The reader of claim 14 wherein said tuning capacitors comprise a plurality of selectively coupled binary weighted capacitors.

17. The reader of claim 13 wherein each of said switches includes first and second power MOSFETs having a source and a drain, wherein for each switch the source of said first MOSFET is coupled to the source of said second MOSFET, the drain of said first MOSFET is coupled to the first node of said switch and the drain of said second MOSFET is coupled to the second node of said switch.

18. The reader of claim 13 wherein each of said driver circuits is coupled to a power supply separate than said supply node coupled to said second antenna node, said power supply for supplying power to said driver circuit during a start-up phase.

19. The reader of claim 13 wherein said transformer and said at least one resonant capacitor are included within said interrogator processing circuitry.

* * * * *